United States Patent [19]

Anderson et al.

[11] 3,735,360

[45] May 22, 1973

[54] HIGH SPEED BUFFER OPERATION IN A MULTI-PROCESSING SYSTEM

[75] Inventors: David W. Anderson, Poughkeepsie; Richard N. Gustafson, Hyde Park; Lance H. Johnson; Francis J. Sparacio, both of Poughkeepsie, all of N.Y.

[73] Assignee: International Business Machines Corporation, Armonk, N.Y.

[22] Filed: Aug. 25, 1971

[21] Appl. No.: 174,824

[52] U.S. Cl. ....................340/172.5

[51] Int. Cl. ....................G06f 15/16

[58] Field of Search ....................340/172.5

[56] References Cited

UNITED STATES PATENTS

| | | | |
|---|---|---|---|
| 3,581,291 | 5/1971 | Iwamoto et al. | 340/172.5 |
| 3,588,829 | 6/1971 | Boland | 340/172.5 |
| 3,618,040 | 11/1971 | Iwamoto et al. | 340/172.5 |

*Primary Examiner*—Raulfe B. Zache
*Attorney*—Robert W. Berray, William N. Barret, Jr. et al.

[57] ABSTRACT

Described is an interlocking scheme which permits multiprocessing in a shared storage configuration with each central processing unit (CPU) having a private high-speed buffer storage utilizing the store-in-buffer concept. The basic problem solved is insuring that all processors access the latest copy of common data with minimum performance impact. The system allows fetch-only copies of the same shared storage block to exist simultaneously in all private storages, but only one private store is allowed to contain a block of data currently being stored into. Disclosed, in addition to the normal controls necessary to search a high speed buffer to determine whether or not the data required by the processor is in the buffer, is means for interconnecting the processors sharing a main storage. The interconnection is for broadcasting address information from one processor to the storage control mechanism of other processors for the purpose of invalidating data in other private storages or insuring that data obtained by one processor from the shared storage is the most current value. That is, if data has been modified in the buffer of another processor, that data must be returned to the shared storage in its modified form to insure that the one processor receives the most current data.

8 Claims, 4 Drawing Figures

INVENTORS
DAVID W. ANDERSON
RICHARD N. GUSTAFSON
LANCE H. JOHNSON
FRANCIS J. SPARACIO
BY
ATTORNEY

HIGH SPEED BUFFER OPERATION IN A MULTI-PROCESSING SYSTEM

BACKGROUND OF THE INVENTION

1. Field of the Invention

The invention relates to data processing systems and more particularly to multi-processing systems wherein each processor employs a high-speed buffer or private store-in combination employs a storage device shared by all processors.

2. Prior Art

An article by C. J. Conti entitled "Concepts For Buffer Storage" published in the IEEE Computer Group News, March 1969, describes a hierarchical memory in which a large slow speed three dimensional core storage operates in conjunction with a relatively small high-speed buffer storage (or cache) manufactured using integrated circuit technology. By using the buffer/backing store arrangement, the central processing unit (CPU) is able to access data at a high rate from the high-speed buffer which is matched more closely to the machine cycle of the CPU. When the CPU provides the address of desired information to the memory system, a control circuit determines whether or not the addressed data has been moved from the backing store to the buffer store. If the data is located in the buffer store, high speed access is possible from the buffer store to the CPU. If the data is not in the buffer store, controls move the data from the backing store to the high-speed buffer and access is possible. A use algorithm is provided to insure that the most frequently used data is stored in the high-speed buffer. If the use algorithm is efficient, most accesses will be to the higher speed buffer store. This should result in a combined system having effective speeds approaching that of the fastest memory at a cost approaching that of the slowest and least expensive memory.

In the prior art, buffer/backing storage apparatus are transparent to the user and the buffer operation is under fixed hardware control. When a CPU initiates a fetch operation, the main storage address is presented to the memory hierarchy. Controls access a search mechanism or directory of the high-speed buffer to determine if the requested address currently resides in the high-speed buffer. If the requested information is in the buffer, it is immediately made available to the CPU. If the requested information is not currently in the buffer, a fetch operation is initiated to the main storage backing store. The buffer location to receive the information from main storage is determined by replacement logic which, in accordance with some predetermined algorithm, determines which address in the buffer store is to be replaced with the new data unit. When the fetch is initiated at the main storage, the exact word requested is first accessed and sent directly to the CPU and the buffer, followed by the remaining words in the same block of data as determined by the particular block size of the system.

There are currently three methods in the prior art for handling store operations. The "store through" method is used on most existing systems and the data is always stored immediately in the main storage and the buffer address mechanism is checked to determine if the address block is currently in the buffer. If the block is in the buffer, the data is also stored in the buffer. However, on some systems, where I/O operations only store into main storage, the buffer block is made invalid by the resetting of an associated valid bit and any subsequent fetches to the same block require accessing the main storage to fetch the data to the buffer.

A second method is the "store wherever." In this method, the buffer address mechanism is checked to determine if the address block is currently in the buffer. If the block is in the buffer, the data is stored directly into the buffer without further action. If the block is not in the buffer, the data is stored in the main storage.

The third method, "store-in buffer", for which the present invention is primarily adapted, brings the block from main storage and then stores the new data into the block in the buffer.

The above-mentioned Conti article discusses various techniques for organizing data and access to that data in the high-speed buffer. One such technique, for which the present invention is primarily adapted, is known as the "set associative" technique. An example of this technique can be found in U. S. Pat. No. 3,588,829, Ser. No. 776,858, Filed Nov. 14, 1968 and which is assigned to the same assignee as this application. In this technique, the address information is broken down into books, pages and words. Depending on the memory size, there can be some predetermined number of books, having a predetermined number of pages, and each page containing a predetermined number of words. As an example, it can be determined that each book should contain 128 pages and that each page should contain some predetermined number of words. When this determination is made, it specifies that the high-speed buffer will have 128 storage sections, each section containing the number of words in a page. Associated with each of the 128 sections of high-speed storage will be a directory, or address index array, containing 128 registers. In the set associative technique of access, the corresponding page number from any of the predetermined number of books will always be found in the same storage section of the high-speed buffer. That is, page 10 from any book in the backing store will always be found in location 10 in the high-speed buffer. The associated register in the directory will be provided with an entry which identifies the particular book to which this particular page 10 belongs. The method of determining if requested data is in the high-speed buffer is to utilize the address bits specifying pages to access the directory, and simultaneously therewith, access the high-speed buffer. The entry in register 10 of the directory is compared with the applied address to determine whether or not the book value of the applied address matches the book value contained in the register. If they do compare, this indicates that the requested page 10 from the requested book is the data contained in the high-speed buffer. If the data is not from the requested book, the page 10 from the requested book is transferred from the backing store to the buffer and inserted in storage section 10 of the high-speed buffer and the identity of the requested book is then inserted in the associated register of the directory.

Another technique, for which consideration has already been given in multi-processing systems, is known as the "fully associative" technique. In this technique, the high-speed buffer may be, for example, provided with 16 storage sections. Associated with each storage section will be a register. The size of each storage section may be capable of storing an entire book. The particular book stored in a particular one of the storage sections will be identified in the associated register. As each address is applied, the book address portion is compared with the entries in all of the registers and if a match is found, the data is specified as being in the section associated with that register. In the fully associative technique, data transferred from the backing store to the buffer store can be placed in any of the locations. When new data must be inserted, a replacement algorithm determines which of the sections should be replaced and new data is inserted in that section and the identity of the book is inserted in the associated register of the directory.

One prior art technique has been shown in a multiprocessing environment which utilizes a fully associative configuration and the store-through concept. A storage protect memory, which is utilized to protect a predetermined fixed amount of data in the backing store, is provided with additional binary bits for reflecting which of the several processors has accessed data from the backing store to its associated private store. Whenever a processor stores data into the backing store, utilizing the store-through concept, the storage protect memory is interrogated and if it is determined that the data block is in another processor's private storage, the mechanism will be utilized to invalidate the data in the other processor requiring that processor to fetch the data from the backing store the next time it is utilized. This prior art technique is limited to a buffer storage configuration in which each storage section must contain the same amount of data as specified in the storage protect memory, and does not address itself to a set associative configuration nor does it consider the problems arising when utilizing the store-in buffer concept.

BRIEF DESCRIPTION OF THE INVENTION

It is an object of this invention to provide a broadcast or interlock mechanism between a plurality of data processors each having a high-speed private storage and each accessing data from a large shared storage.

It is also an object of this invention to provide high-speed buffer operation in a multi-processing configuration to insure that each processor accesses the most current value of a particular operand.

It is another object of this invention to provide high-speed buffer operation in a multi-processing configuration wherein the invention can be adapted to various storage control techniques such as store-in-buffer, store-through, fully associative access, or set-associative access.

The above objects are accomplished in a multiprocessing system which includes a shared storage and a plurality of processing units. Each processing unit includes a private, high-speed buffer storage, an associated directory for providing an indication of the data transferred from the shared storage to the high-speed buffer, and a storage control means which accepts signals from the associated processor, including the shared storage address of data to be operated on, and an accessing control signal which indicates that the data is to be fetched for transfer to the processor or that the processor is to store data into the operand location.

The present invention provides means interconnecting all the processors to perform an interlocking function. The interlocking function is accomplished by broadcasting, under certain specified conditions, address information to all other processors from a particular one of the processors in addition to the access control signal to indicate whether or not the operation is to be a fetch or a store. Utilizing the broadcasted address and access control signals, the storage control mechanism of all other processors is operated to determine further action in connection with the data requested by the particular processor.

The private high-speed buffers have a predetermined number of storage sections and an associated directory register for identifying the address of the shared storage data presently stored in the high-speed buffer. By providing various combinations of additional binary bits in the registers of the directory or index array, various forms of storage organization and access methods can be controlled by the broadcasted address and access control information to insure that each processor accesses the most current value of the operand identified in the shared storage.

If only one additional control bit is provided in each of the directory registers, which signifies the validity of the data in the associated storage section, each processor must broadcast address and access control information whenever data is to be stored by a particular processor. The directory of all other processors is searched to determine whether or not the same data is contained in he associated private storage. If so, the validity bit is reset to reflect that the data is no longer valid in the associated private storage. Another bit which can be provided in the directory registers is a bit called a fetch-only bit. This bit is set and reset to reflect whether or not the data in the particular one of the private storages is the only copy of the data stored in a private storage. That is, if a particular processor has fetched data from the shared storage into the private storage, and it is known that this is the only copy of the data in the private storages, the fetch-only bit will reflect this. The need for broadcasting the address and access control signals for a store operation would not exist. Another binary bit which can be provided in the registers of the directory or index array, is a bit known as a store bit. This bit is set and reset to reflect a condition wherein the data in the high-speed buffer of a particular processor differs from the data in the shared storage. That is, when utilizing the store-in buffer concept, all accesses to data by particular processors are made in the high-speed buffer including accesses for the storage of data. When the data has been transferred to the high-speed buffer of a particular processor, and that data is subsequently stored into in the buffer, the store bit is set. Whenever a particular processor request requires transfer of new data from the shared storage to the high-speed buffer for either storing or fetching, the address and access control signals will be broadcast to the other processors. The address information of the requested data is utilized to search the directories of all other processors to determine whether or not the requested data resides in one of the other private high-speed storages and whether or not that data has been stored into. If the data has been stored into by another processor, that data must first be transferred back to the shared storage in its modified form so that the processor requesting the data will receive from the shared storage the most current value. This requirement is not necessary if the determination is made that the data in the other processor has not been stored into and therefore has the same values as the operands in the shared storage.

DETAILED DESCRIPTION

Figure 1:
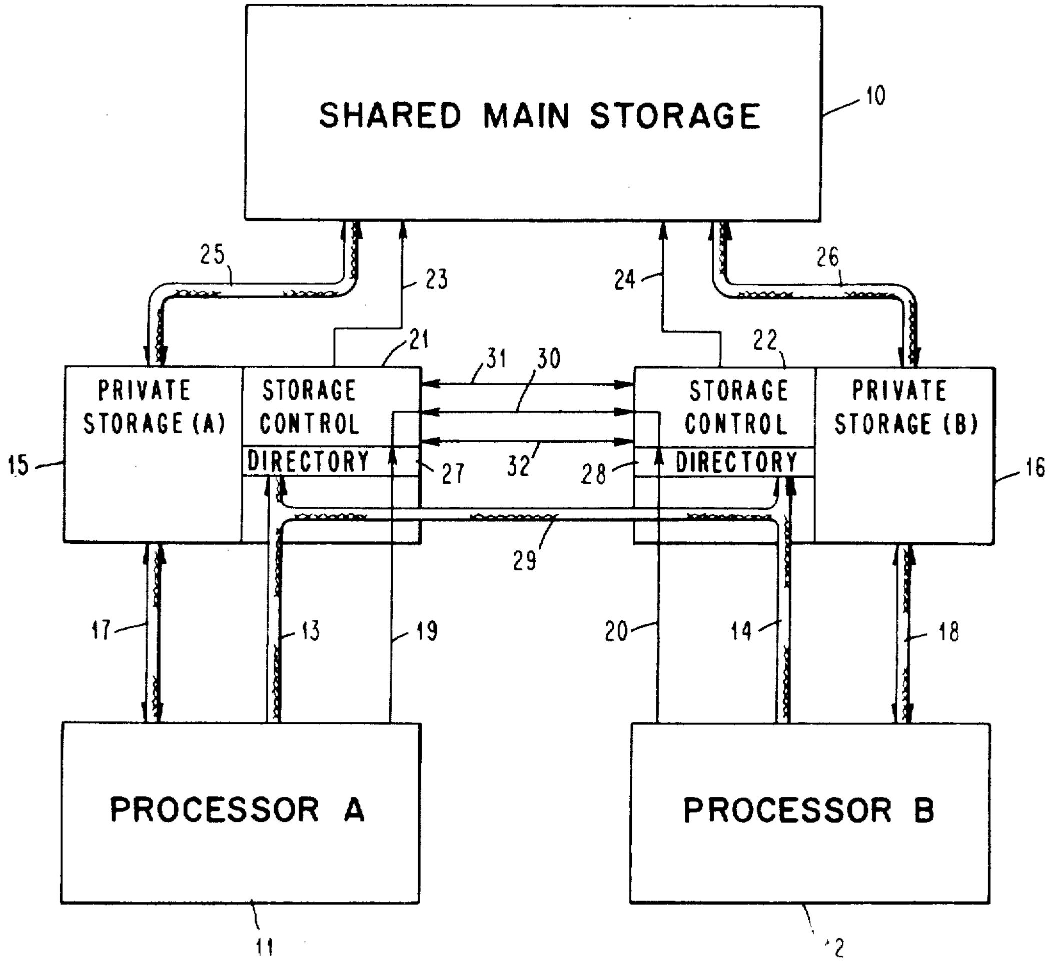
FIG. 1 is a block diagram showing the interconnection for broadcast purposes between processors each having private high-speed storage.

FIG. 1 shows generally the environment of the present invention. Operands to be utilized in the system are contained in a shared main storage 10. The operands are accessed by a plurality of data processors 11 and 12. Each of the processors 11 and 12 identify operands in shared storage 10 on address busses 13 and 14. Processors 11 and 12 have private high-speed storage 15 and 16 and data busses 17 and 18 for the transfer of data between processors and the local private storage. A request for access to locations of operands specified on the address busses 13 or 14 are signalled on access control lines 19 and 20. The access control signals will specify that the processor desires access to the operand location for the purpose of fetching data to the processor or storing data from the processor into the accessed location.

The address information provided on busses 13 and 14 is applied to local storage control units 21 and 22 for the purpose of determining whether or not the data requested is accessible in private storage 15 or 16. If the requested data is in the private storage 15 or 16, the data will be immediately transferred on data busses 17 or 18. If the storage control unit 21 or 22 determines that the requested data is not in the private storages 15 or 16 respectively, a request will be made on control lines 23 or 24 to initiate transfer of the data from shared storage 10 to private storage 15 or 16 on storage data busses 25 or 26. The method of determining whether or not the requested data is in the local private storage is by means of a search mechanism which includes directories 27 and 28.

In accordance with the present invention, the processors are interconnected for the purpose of broadcasting information necessary to insure that each processor will access operand locations which have the most current value of an operand in view of the fact that each of the processors, independently, may be modifying the operand values. Although various modifications to the general concept of broadcasting will be discussed, the minimum amount of interconnections will include a bus 29 for transferring address information between the processors, and a control line 30 for signalling from one processor to others that the one processor is accessing an operand location for the purpose of fetching or storing data. In accordance with one modification which specifies the store-in-buffer technique, another interconnecting signal line 31 is provided for signalling from one processor to the others that a transfer is taking place from shared storage to a private storage. Interconnecting signal line 32 is provided in another form of the present invention in which various controls are energized in dependence on whether or not more than one copy of a particular block of operands exists in the various private storages.

Figure 2:
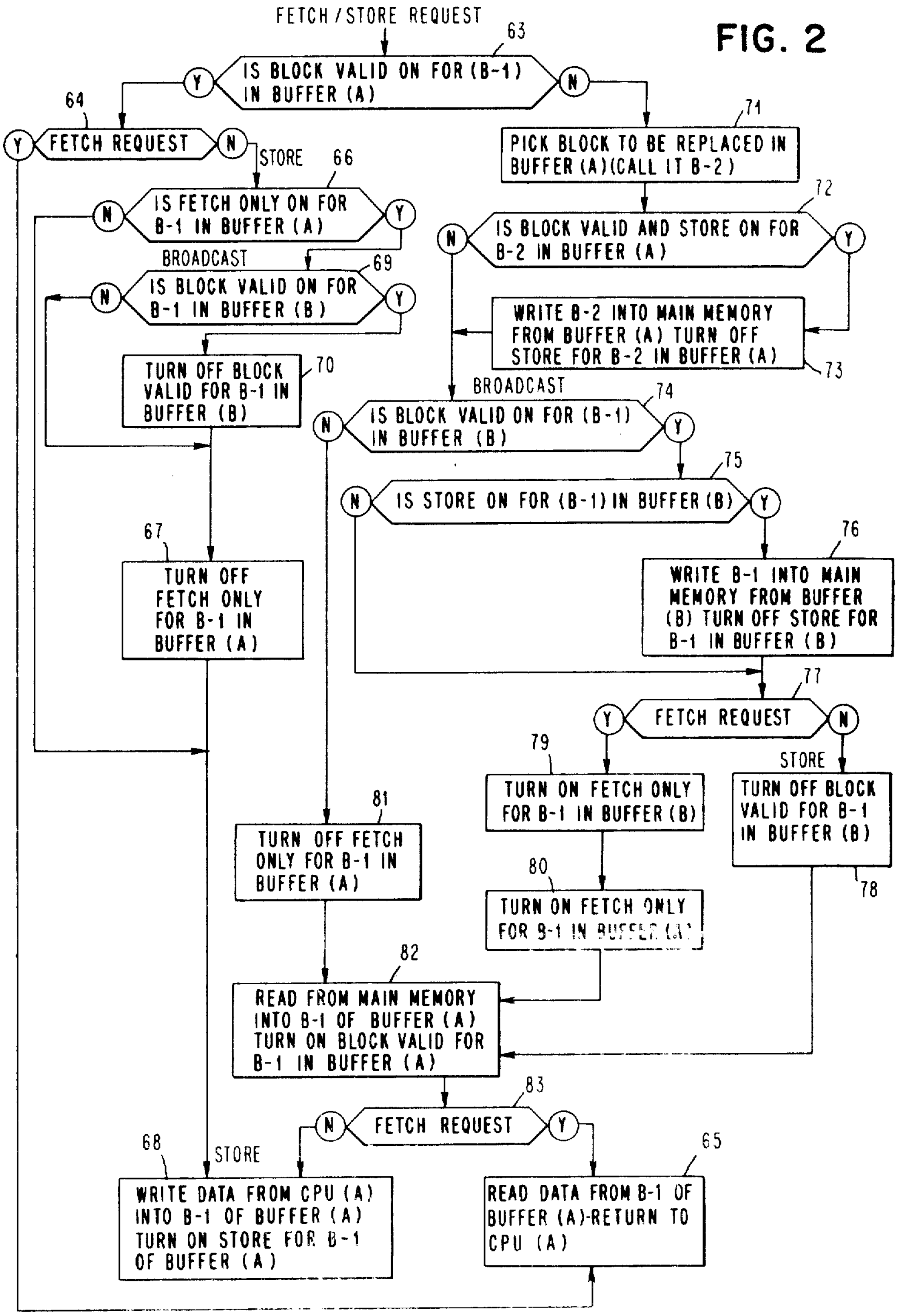
FIG. 2 is a flow chart of logic decisions and sequences.

FIG. 2 is a flow chart of the logic decisions and sequences of decisions made in response to a request for access to a shared storage location by a processor, wherein the access request is for the purpose of fetching data or storing data in the accessed location. Before discussing the sequences as shown in FIG. 2, a brief description of the general makeup of the private storage, directory, and storage control apparatus for one of the processors will be discussed in connection with FIG. 3.

Figure 3:
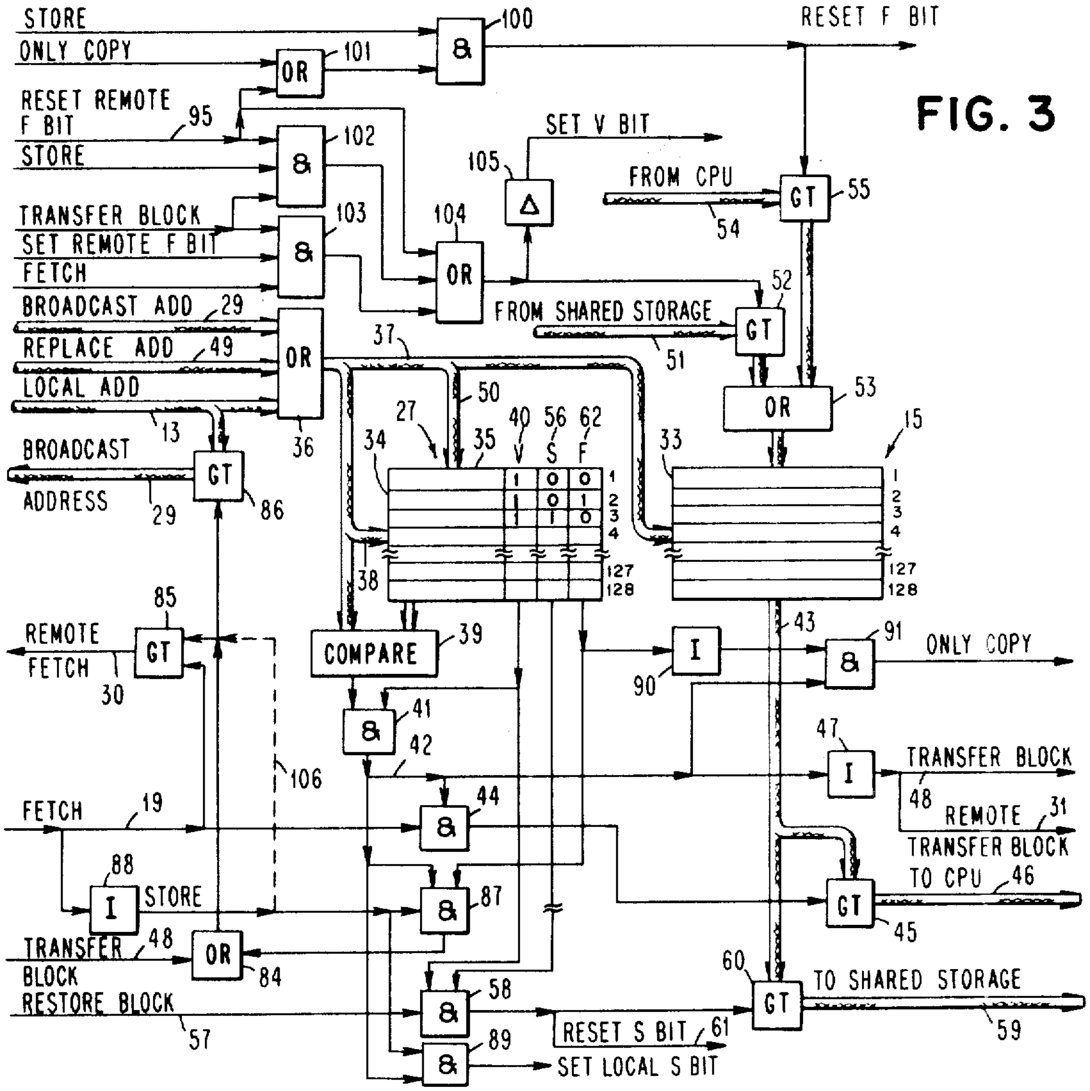
FIG. 3 is a logic diagram showing the basic controls of a storage control unit in each processor and the logic for determining the need for broadcasting information.

In FIG. 3, structure already discussed in connection with FIG. 1 has been given the same numerical designation. The preferred embodiment of the present invention is utilized in a high-speed private storage system wherein the set-associative method of ordering and storing data is utilized along with the access method known as store-in-buffer. That is, every access request by a processor must eventually be accomplished in the high-speed storage, whether for the purposes of fetching data or storing data.

The private storage 15 is shown to include 128 storage sections 33. Each of the storage sections 33 has a capacity for storing a block of data operands designated as a page in the above-mentioned U. S. Pat. No. 3,588,829. Associated with each of the 128 storage sections 33, are 128 registers 34 forming the directory 27. In accordance with the above-mentioned patent, one section 35 of each of the registers 34 will contain the address designation of a particular book from the shared main storage 10. In other words, page 4 from any book in the shared main storage 10 will always be transferred to and stored in storage section number 4. The particular book from which the page 4 was transferred will be designated in the section 35 of register number 4.

When an access request is signalled on line 19 from the local processor 11, the local address information on bus 13 will be passed through an OR circuit 36 for the purpose of searching the directory 27 to determine whether or not the requested data is in the private storage 15. The portion of the address information which specifies a page number will be utilized on busses 37 and 38 to access the designated register 34 and storage section 33. The book address information will be read from the accessed register 34 and will be utilized in a compare circuit 39 to determine whether or not the block address information stored in the accessed register 34 is equal to the block address information provided on the address bus 13.

The purpose of a number of additional binary bits associated with each of the registers 34 will be more thoroughly discussed subsequently. At present however, the presence of a valid bit 40 will be mentioned. When the valid bit has a binary one value, and the compare circuit 39 indicates that the block address requested on bus 13 matches the block address accessed in the register 34, an AND circuit 41 will provide an output signal on line 42 indicating a block-valid condition. That is, the requested block of data is stored in the private storage 15 and is valid.

The address information provided on the bus 37 to the private storage 15 will access the identified storage section 33 and provide that data on a bus 43. In response to an access request for fetching on signal line 19, and the determination that the block is valid in the private storage, an AND circuit 44 will provide a signal to a gate 45 for the purpose of transferring the requested data immediately to the CPU on a bus 46.

When, in response to the searching of the directory 27 with the address information on bus 13, it is determined that the requested block of data is not validly stored in the private storage 15, an inverter circuit 47 will provide an output signal 48 indication the need to transfer the requested block of data from the shared storage 10 to the private storage 15.

If the private store and directory are configured in accordance with the above-mentioned patent, a replacement algorithm will be enabled to select a storage section to receive the requested data. The address of the storage section to be replaced will be indicated on a bus 45 which is also applied through OR circuit 36 to provide access to the register associated with the storage section to be replaced. The valid bit 40 associated with that register will be reset to indicate that the data presently contained in the private storage 15 is no longer valid. Further, the block identifying address portion of the requested data will be inserted into the accessed register 34 on a bus 50. The block of data which is returned from the shared main storage 10 will be on a bus 51 applied through a gate 52 and OR circuit 53 to the storage section selected for replacement.

If the requested block of data which was transferred from the shared main storage to the private storage was in response to a fetch access request by the associated processor, the AND circuit 44 will now provide an indication necessary to energize gate 45 to transfer the requested operand to the processor on bus 46. To be more fully discussed subsequently, if the requested block of data was to be brought to the private storage 15 for the purpose of storing data in one of the operand locations, the data to be stored into the private storage will be provided on a bus 54 through an enabled gate 55 and the OR circuit 53 to the identified operand location in the storage section 33.

When it is determined that a block of data in one of the storage sections 33 of private storage 15 is to be replaced, one additional binary bit associated with each of the registers 34 will be effective. The relationship of this additional bit, labeled a store bit 56 will be more thoroughly discussed in connection with the broadcast mechanism. In can be utilized to indicate that the data to be replaced in the selected storage section 33 has been modified or stored into by the associated processor while in the storage section 33. Whenever an associated processor stores data into storage section 33, the store bit 56 in the associated register 34 will be set to a binary one condition. When the indication for a data transfer is given on line 48, a further signal indicating the possible need to restore a block will be given on a signal line 57. AND circuit 58 will make the determination that the data in the storage section 33 to be replaced is valid and has been stored into. The need for the store bit is more evident when it is recalled that the store-in-buffer concept is utilized. The store bit 56 having a binary one condition indicates that the data in the storage section 33 of the private storage 15 has been modified and is no longer identical to he same block of data retained in the shared main storage 10. Therefore, when the data in the private storage differs from the data retained in the shared storage, AND circuit 58 will be utilized to initiate the transfer of the block of data being replaced to the shared storage on a bus 59 through a gate 60 enabled by the output of AND circuit 58. When the data in the particular storage section is transferred back to the shared main storage, and the new data transferred from main storage to the private storage, the line 61 will be utilized to reset the store bit 56 to binary zero reflecting that the data now contained in the storage section 33 is the same as that found in the shared storage 10.

One additional binary bit associated with each register 34 of FIG. 3 will now be defined. That additional binary bit is referred to as the fetch-only bit 62. When this fetch-only bit is a binary 0, it indicates to the storage control mechanism that this particular private storage has the only copy of the block of data from the shared storage 10. That is, no other private storage 15 has requested this particular block of data. When the fetch-only bit is in the binary 1 state, this indicates that some other processor has at some time transferred the same block of data from the shared storage 10 to its private storage.

The three most pertinent states of the valid bit 41 (V), store bit 56 (S), and fetch-only bit 62 (F) is shown in directory positions 1, 2, and 3. The state in position 1 indicates that this processor's private storage contains the only copy of the identified block of data. This particular block can be stored into by this processor without affecting the same data in any other private storage. The state indicated in position 2 indicates that the block is valid in this particular private storage but that it also exists (or did exist at some time) in another processor's private storage. This particular processor can only read data from this block without the requirement for notifying another processor of any action. Before the processor can store into this block, a broadcast of information must be made to invalidate the data in the other private storages and change the designation in this private storage to that shown in position 1. The state indicated in position 3 is essentially the same as that shown in position 1 except that this block of data has been stored into by this processor and therefore is the most up-to-date copy of this block of data.

Discussion will now return to FIG. 2 to provide a general indication of logic decisions and sequences which must be made in order to cause all of the private storages of all processors to reflect the correct value of a particular operand in view of the fact that each processor may be operating independently with the data contained in its associated private storage. In FIG. 2, the designation B-1 designates the requested block of data by the associated processor. The designation B-2 indicates the block of data in a private storage which is to be replaced by new data.

In response to a fetch or store access request from processor A, decision block 63 will determine if the block-valid signal is produced for the requested block in buffer A. If the block is valid, decision 64 will determine whether or not it is a fetch request or a store request. If a fetch request, the action taken at 65 will follow. The data from the requested block B-1 of buffer A is returned to the processor A. When decision block 64 determines that the request is for a store operation, decision block 66 will determine whether or not the fetch-only bit is on or off for the requested block in buffer A. If the fetch-only bit is off, the action shown at 68 will take place. Namely, the data from processor A will be stored into the proper operand location of block B-1 in buffer A. Also, the action of storing into block B-1 of buffer A will cause the store bit to be turned on in buffer A.

If decision 66 indicates that the fetch-only bit was a binary 1, this indicates that other private storages contain (or did contain at some time) a copy of the same block of data. Therefore, the need for broadcasting information on the interconnecting means between processors is initiated. The basic information broadcast is the address of the requested block B-1 and whether or not it was for a fetch or store access request. When the broadcast data is received at the other processors, decision block 69 will determine whether or not the requested block B-1 is valid in that particular private storage, herein designated processor B. If the requested block B-1 is not valid in the other private storage, the fetch-only bit in the buffer of processor A will be turned off at 67 and the store operation can take place at 68.

When it is determined that the requested block B-1 is valid in the private storage of processor B, the block valid bit for the storage section containing the requested block B-1 will be turned off at 70 since the broadcast was the result of a store access request in processor A. This will have the effect of causing processor B to request a transfer of the data from the shared storage 10 to its private storage the next time processor B attempts access of the data in block B-1. When the block valid trigger has been turned off for block B-1 in buffer B, the fetch-only bit for block B-1 in processor A will be turned off at 67 and the store operation can take place at 68.

The remainder of the logic decisions and sequences shown in FIG. 2 take place when it is determined at 63 that the requested block B-1 is not valid in processor A. When the requested block is not valid in buffer A, the replacement algorithm is enabled at 71 to pick a block to be replaced in buffer A, and will subsequently be identified as block B-2. At this point, the decision is made at 72 as to the need for restoring the data from the private storage back to the shared main storage 10. As indicated previously, this decision depends on the condition of the valid bit and store bit in block B-2 of the buffer of processor A. If the valid and store bit are on, the action at 73 takes place. Namely, the block B-2 to be replaced is transferred to the shared storage 10 from buffer A and the store bit for the storage section which contains B-2 in buffer A is turned off. When the restoring of the block of data has taken place at 73, or it is determined that it is not needed at 72, broadcasting of address and access control information must take place. The need for the broadcast of information at this point is to determine whether or not the requested block B-1 is contained in the buffer of processor B and whether or not the value of the operands in the buffer or processor B are the same as, or different from, the block of operands in shared storage 10.

The broadcast address and access control signal is utilized to search the directory in processor B for the presence of the requested block B-1, and the decision as to whether or not block B-1 is valid in buffer B is determined at 74. If the requested block B-1 is in buffer B, and the store bit for the requested block B-1 in buffer B is one as indicated at 75, the block of data B-1 must be restored to shared storage 10 from the buffer of processor B as shown at 76. Also, the store bit for block B-1 in the buffer of processor B is turned off to indicate that the data in shared storage 10 is now the same as the data found in the buffer of processor B. When the block B-1 has been restored to shared storage 10, or it has been determined that this is not required, the next determination shown at 77 is whether or not the access request at processor A is for the purpose of fetching data or storing data. If the access request at processor A is not for a fetch, and therefore a store, the action taken at 78 is to turn off the block valid bit for block B-1 in the buffer of processor B thereby forcing processor B to make its next request for an operand from block B-1 to shared storage 10.

If the decision at 77 indicates that the request at processor A is for the purpose of fetching data, the fetch-only bit for the block B-1 in buffer B is turned on at 79 and the fetch-only bit for block B-1 in processor A is turned on at 80 thereby reflecting that more than one copy of block B-1 exists in the private storages of all processors.

If as a result of the broadcast of information, the decision is made at 74 that the requested block B-1 is not validly in the buffer of processor B, the fetch-only bit for the requested block B-1 in the buffer of processor A will be turned off at 81 reflecting that the buffer of processor A has the only copy of block B-1 other than that found in the shared storage 10.

When it has been determined that the block which must be transferred from shared storage 10 to the buffer of processor A is valid in the shared storage 10, the block B-1 will be transferred from the shared storage 10 to the selected storage section of the buffer of processor A and the valid bit in the associated register for block B-1 will be turned on. This action is shown at 82. When the data has been transferred from shared storage 10 to the buffer of processor A, the determination of a fetch or store request is made at 83 and the actions indicated at 65 or 68 will take place.

Figure 4:
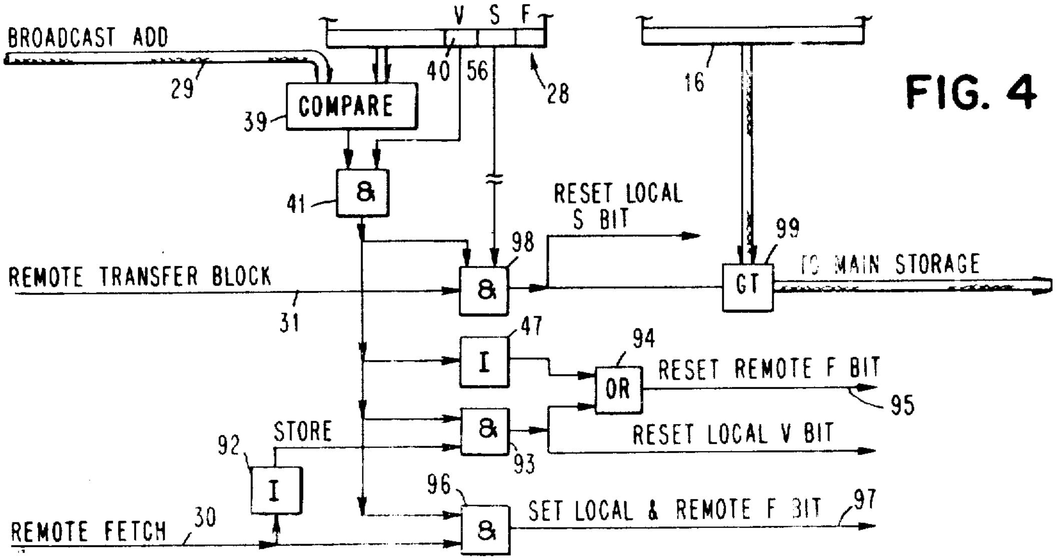
FIG. 4 is a logic diagram of the storage control unit in each processor which responds to broadcast address and access control signals from a remote processor.

The logic decisions and sequences discussed in connection with FIG. 2 will now be related to FIGS. 3 and 4. FIG. 3 is intended to represent that portion of logic necessary for one of the processors to initiate a broadcast, or transfer, of access control information and address information on the interconnecting means. FIG. 4 shows the logic required in other processors for responding to the broadcast information.

The need for broadcasting address information on the interconnecting address bus 29 and the transfer of the access control signal on line 30, to be considered as remote signals, is accomplished by an OR circuit 84, gate 85, and gate 86. The need to broadcast address and access control information based on the decisions of FIG. 2 indicating that the requested block is valid in the requesting system and that the access is for the purpose of storing information is represented by an AND circuit 87. AND circuit 87 responds to the block valid signal from AND circuit 41, an indication that the fetch-only bit for the requested block is a binary 1 and the signal that the access request is a store operation generated from inverter 88. The output of AND circuit 87 is applied to OR circuit 84 to thereby energize gates 85 and 86 to broadcast, or transfer on the interconnecting means, the requested block address and the access request. As mentioned earlier, if the fetch bit 62 for the requested block is binary 0, indicating that this is the only copy of the data, AND circuit 87 will not produce an output signal and will therefore inhibit the broadcasting of information.

As discussed in FIG. 2, when the processor requesting information detects that there is a need for transferring the block from the shared storage 10 to the private storage 15, the signal on line 48 indicating a need to transfer a block is applied to OR circuit 84 to thereby enable gates 85 and 86. The signal on line 48 is transferred as a remote signal to other processors to initiate the decisions starting at 74 in FIG. 2.

Other logic shown in FIG. 3, which responds to the initial search of the directory 27 by the applied local address on address bus 13, includes an AND circuit 89 which responds to a block valid signal and the requirement of a store access request to set the S bit 56 associated with the accessed storage section and register. Inverter 90 and AND circuit 91 respond to a search of the directory 27 to indicate that the requested block is valid and that it is the only copy of the requested block of data.

Referring now to FIG. 4, there is shown the logic in all of the processors which is rendered effective when information is broadcast or transferred on the interconnecting address bus 29 and access control line 30. The only additional line required to be transferred on the interconnecting means to other processors is the line labeled 31 signifying that the broadcasting processor is required to transfer a block of data from the shared main storage 10 to the private storage. The broadcast of address information will be utilized to search the directories of other processors.

In FIG. 4, the directory 28 of processor B and private storage 16 of processor B is shown. The same compare circuit 39 and AND circuit 41 will provide the block valid signal on line 42 and a block not valid signal from an inverter 47. An inverter 92 responds to the remote access request line 30 to indicate when a remote store is taking place. AND circuit 93 provides the decision indicated in decision block 69 of FIG. 2. When the requested block is valid in the other processors, and the processor which is broadcasting is storing information, AND circuit 93 will be effective to reset the valid bit 40 of the corresponding block of data in processor B which is being stored into by processor A. At the same time, the output of AND circuit 93 will be effective at OR circuit 94 to transfer to processor A on the interconnecting means, on line 95, the signal necessary to reset the fetch-only bit 62 of processor A to reflect that processor A now has the only valid copy of the block of operands for storing into. OR circuit 94 also responds to inverter 47 which signals that the block requested by processor A is not valid in the private storage of processor B to also thereby reset the fetch-only bit of processor A.

An AND circuit 96 responds to the remote fetch signal 30 and block valid signal from AND circuit 41 to indicate both to the local directory 28 of processor B and the directory 27 of processor A that more than one copy of the requested block of data exists in the private storages. This line labeled 97 sets the local F bit and is effective on the interconnecting means to set the F bit of processor A.

The remaining logic shown in FIG. 4, AND circuit 98, provides the decision shown at 72 of FIG. 2. That is, when processor A has signalled that it is transferring a block of data on line 31, that the requested block of data is valid in processor B, as signalled on line 42, and processor B has stored into the block of data as indicated by the binary 1 condition of the store bit 56, the contents of the storage section of private storage 16 will be transferred by a gate 99 to its proper location in the shared main storage 10. Also, the output of AND circuit 98 will be utilized to reset the local S bit 56 to reflect that the value of the operands transferred to the shared main storage 10 are now identical to the data contained in the storage section of the private storage 16.

Returning now to FIG. 3, the remainder of the logic shown will be discussed. The indication that the local processor is storing information into a block of data which is the only copy outside of shared storage 10 is indicated by an AND circuit 100, and an OR circuit 101. The output of AND circuit 100 will be effective at gate 55 to immediately transfer the data on bus 54 from the local CPU into the accessed storage section 33 of private storage 15. The other input to OR circuit 101 is provided by the interconnecting signal line 95 indicating that the other processors have reset the fetch-only bit 62 in the broadcasting processors directory. AND circuits 102 and 103 will be rendered effective when inverter 47 indicates a need to transfer a block of data from the shared main storage 10 to the local private storage 15. Gate 52 which transfers the data on bus 51 from shared storage to private storage 15 will be enabled through an OR circuit 104.

The direct application of the reset remote F bit signal line 95 to OR circuit 104 reflects the decision made at 74 in FIG. 2 and is generated in response to the determination that the requested block is not contained in any other private storage. AND circuit 102 reflects the decision made when the local processor wishes to store data into a block, but that block has to be transferred from the shared main storage 10 to the local private storage 15. When the need for a block transfer from shared storage 10 to private storage 15 is signalled, the action block 78 of FIG. 2 reflects that the valid copy in processor B is made invalid by the AND circuit 93 of FIG. 4 which also generates, through OR circuit 94, the reset remote F bit signal 95. When this has been received by AND circuit 102, OR circuit 104 will enable gate 52 to transfer the block of data from the shared storage 10 to the private storage 15.

AND circuit 103 reflects the decisions made which ultimately generates the signal shown in action block 80 of FIG. 2 which turns on the fetch-only bit in the private storages of both processors. Once again, OR circuit 104 provides the indication to initiate the transfer of a block of data from shared storage 10 through gate 52. A delay circuit 105 generates a signal to set the valid bit 40 in the directory 27 after the block of data has been transferred to the selected storage section 33 of the private storage 15.

As mentioned previously, the preferred embodiment of the present invention includes a private storage and directory configuration utilizing the set-associative technique. Further, the storage method known as store-in-buffer is implemented, and various controls and decisions are generated in response to the valid bit, store bit, and fetch-only bit. Various modifications can be made to this basic system. The directories 27 or 28 may contain only a valid bit 40. In this situation, whether store-in-buffer, store through, or store wherever is utilized, the need for the broadcasting of address and access control information is required whenever a storage operation into a private store or shared storage is accomplished. The dotted control line 106 of FIG. 3 reflects this situation. That is, whenever a processor stores information, the other processors must be interrogated with the broadcast address and access control information to invalidate the data in any other private storage which also contains the block of data being stored into.

The next possible modification is to add to the previously mentioned valid bit 40, the fetch-only bit 62 which would negate the need to broadcast this information on a store operation when it is determined that the block of data being stored into is only contained in a single private storage. When using only the valid bit or the valid bit and the fetch-only bit, and when there is a need to transfer a block of data from the shared main storage 10 to a requesting processor, there will be a need to determine whether or not block of data resides in any other private storage. If the block of data does reside in another private storage, it will be necessary to initiate a transfer of the block of data from the other private storage to the shared main storage 10 prior to transferring the block to the requesting processor. Further, any block being replaced in a particular one of the private storages will always have to be transferred back to its proper location in the shared main storage 10 since it will not be known for certain whether or not that data has been modified while in the local private storage.

By the addition to each of the registers in the directories of the store bit 56, the need for initiating a transfer of blocks of data from a private storage to the shared main storage can be eliminated when it is determined that the block of data in the private storage has not been stored into prior to the time it is replaced by the replacement algorithm.

Although the preferred embodiment of the present invention is utilized in a set-associative configuration, the fully associative technique can be utilized. By the provision of the additional control bits in each of the associative registers, the various storage control methods can be implemented. Further, by associating the valid bit 40, store bit 56, or fetch-only bit 62, more flexibility is provided in choice of the size of the block of data transferred back and forth between private storage and the shared storage. By eliminating the need to equate the necessary interlocks to a predetermined block size which is protected by another mechanism, there would not be a need to invalidate the entry in another private storage whenever any one particular operand is modified out of the block of protected operands.

While the invention has been particularly shown and described with reference to a preferred embodiment thereof, where interconnecting means are provided between a plurality of processors sharing a main storage so that each processor can operate with a private high-speed storage and maintain access to the most current value of any particular operand referenced in the shared main storage, it will be understood by those skilled in the art that various other changes in form and details may be made therein without departing from the spirit and scope of the invention.

What is claimed is:

1. A data processing system comprising:

shared storage means for storing a plurality of operands at addressable locations;

a plurality of processing means, each including means to provide a local address signal identifying an operand location in said shared storage means, and local access control means for signalling an access request for fetching data from or storing data in the addressed location;

each said processing means having connected thereto a local high speed buffer system including :

private storage means connected to said shared storage means for storing a predetermined portion of operands previously transferred from said shared storage means to said private storage means, directory means for identifying the operands in said private storage means for immediate access by said processor and, storage control means including means responsive to said local address signal means, said local access control means, and said directory means for providing in said private storage means, access to an operand from an identified operand location; and means interconnecting all of said processing means and said high speed buffer system responsive to address signals provided by said processing means representing a particular operand location for causing the most current value of the particular operand to be accessed by all said processing means.

2. A data processing system in accordance with claim 1 wherein, each said private storage means includes:

a plurality of storage sections, each said section storing a block of a predetermined number of operands transferred from said shared storage;

each said directory means, includes:

a plurality of registers each of said registers being associated with a predetermined one of said storage sections, and each including a block address portion and valid bit having first and second states for identifying the block of said shared storage operands in said storage section and the validity thereof when said validity bit is in said first state;

each said storage control means includes:

search means, responsive to said local address signals, including means for searching said directory and providing a block-valid signal or block-not-valid signal dependent on whether or not the applied local block address identifies a block with valid data in one of said storage sections, and including processor data gating means connected between said local private storage and processing means and responsive to said block-valid signal and said local access control means for providing access by said processor to the identified operand in said storage section; and said interconnecting means includes:

broadcast means in each of said processing means, including remote signalling means connected and responsive to said local address signals and said local access request control signal for storing data for transferring said signals from any one of said processing means to said search means of other of said processing means; and means in the other of said processing means responsive to said block-valid signal and said remote access request control signal for storing data to generate an invalidate signal to change said valid bit to said second state in the one of said registers having said block address portion the same as the block address of said remote address signals.

3. A data processing system in accordance with claim 2 wherein, each of said registers further includes:

a fetch-only bit having a first or second state, the first state indicating that the block of operands transferred from said shared storage to said associated storage section is valid in one of said private storage means of said other of said processing means; and said broadcast means of said interconnecting means further includes:

means connected and responsive to the first state of said fetch-only bit, whereby said interconnecting means is enabled only when said block of operands is validly stored in more than one of said private storage means.

4. A data processing system in accordance with claim 3 wherein, said interconnecting means further includes:

reset signalling means in said other of said processing means, connected and responsive to said block-not valid signal or said invalidate signal for resetting said fetch-only bit in said register of said one of said processing means.

5. A data processing system in accordance with claim 2 wherein, said remote signalling means of said broadcast means further includes:

means responsive to said block-not valid signal in said one of said processors for transferring said applied local address and said block-not valid signal to said search means of said other of said processors;

said search means of said other of said processors further includes:

up-date gating means, responsive to said block-valid signal and said remote block-not valid signal and connected to said storage data gating means for transferring the block of operands identified by said remote block address from said storage section to said shared storage; and said search means of said one of said processors further includes:

storage data gating means connected between said local private storage and said shared storage responsive to said block-not valid signal, for selecting one of said storage sections, and for transferring the block of operands from said selected storage section to said shared storage and the block of operands identified by the applied local block address from said shared storage to said selected storage section, and for entering the block address in said associated register and for setting said valid bit.

6. A data processing system in accordance with claim 5 wherein, each register in each of said directory means includes:

a store bit having first and second states, said first state indicating that the block of operands in said associated storage section has been stored into by said local processor;

said up-date gating means is further responsive to the first state of said store bit; and said storage data gating means from said private storage means to said shared storage is further responsive to the first state of said store bit and said valid bit of said register associated with said selected storage section, whereby transfer of blocks of operands from said private storage to said shared storage is only effected when the block of operands in said private storage has been stored into and therefore differs from the operands in said shared storage.

7. A data processing system in accordance with claim 6 wherein, each said storage control further includes:

means for resetting said store bit of said registers when the block of operands of said associated storage section are transferred to said shared storage.

8. A data processing system comprising:

shared storage means for storing a plurality of operands at addressable locations;

a plurality of processing means, each including means to provide local address signals identifying an operand location in said shared storage means, and local access control means for signalling an access request for fetching data from or storing data in the addressed location;

each said processing means having connected thereto a local high speed buffer system including :

set-associative private storage means connected to said shared storage means for storing a predetermined portion of operands previously transferred from said shared storage means to said private storage means, directory means for identifying the operands in said private storage means for immediate access by said associated processor and, storage control means including means responsive to said local address signal means, said directory means and said local access control means for providing in said private storage means, access to an operand from an identified operand location in response to a fetch request, and, in response to a store request, providing access to said identified location in said shared storage and said private storage upon condition that said identified operand is in said private storage; and means interconnecting all of said processing means and said high speed buffer system, responsive to address signals provided by said processing means representing a particular operand location for causing the most current value of the particular operand to be accessed by all said processing means.

* * * * *